July 18, 1967

F. T. IRGENS ET AL 3,331,331

CHAIN SAW

Filed Sept. 20, 1965

INVENTORS
FINN T. IRGENS
BY LEO T. KINCANNON

Wheeler, Wheeler & Wheeler
ATTORNEYS

July 18, 1967 F. T. IRGENS ET AL 3,331,331
CHAIN SAW
Filed Sept. 20, 1965 2 Sheets-Sheet 2

INVENTORS
FINN T. IRGENS
BY LEO T. KINCANNON

Wheeler, Wheeler & Wheeler
ATTORNEYS

United States Patent Office 3,331,331
Patented July 18, 1967

3,331,331
CHAIN SAW
Finn T. Irgens and Leo T. Kincannon, Milwaukee, Wis., assignors to Outboard Marine Corporation, Waukegan, Ill., a corporation of Delaware
Filed Sept. 20, 1965, Ser. No. 488,612
25 Claims. (Cl. 103—54)

This invention relates generally to pumps and, more particularly, to chain saws including oil pumps affording lubrication of the chain saw, as well as the saw chain.

An important object of the invention is to provide a pump which affords intermittent pumping of quantities of lubricating fluid, such as oil. Such a pump is desirable for use with a chain saw to provide continuous lubrication of the saw chain during the cutting operation.

In accordance with the invention, the pump includes a housing formed with a pumping chamber which is provided with an inlet and an outlet. A piston is carried in the housing for fluid pumping movement relative to the pumping chamber. Provision is made for intermittently reciprocating the piston to afford periodic fluid pumping operation from the inlet to the outlet. In particular, means are provided in the form of at least two members which are coaxially aligned and carried on the housing for axial movement of at least one member relative to another member and for rotatable movement of all of the members relatively to the piston. The members are rotatably driven by a common driver, and one or more of the members is arranged to rotate relative to another member upon rotation of the members by the driver. Provision is made for affording intermittent insertion and withdrawal of the piston relative to the pumping chamber in response to said relative rotation between the members.

Other objects and advantages will become apparent from the following description and accompanying drawings in which.

Figure 1:
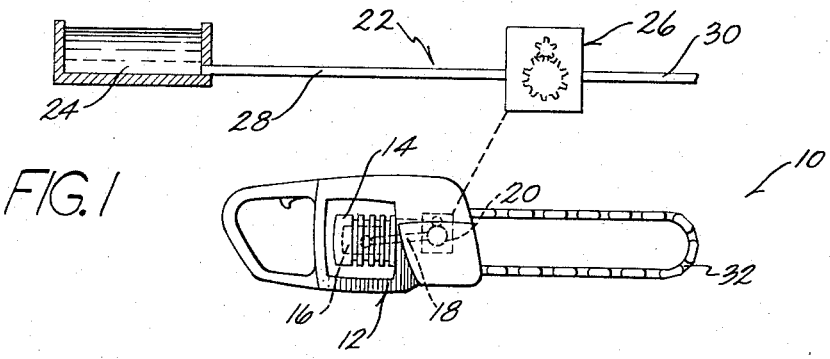
FIGURE 1 is a diagrammatic view of a chain saw embodying an oil pumping system in accordance with the invention.
Figure 3:
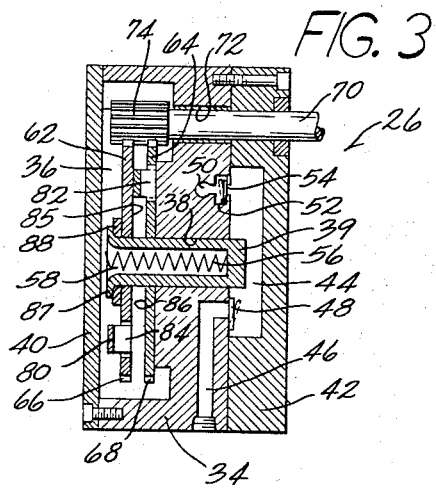
FIGURE 3 is a sectional view taken along line 3—3 of FIGURE 2.
Figure 2:
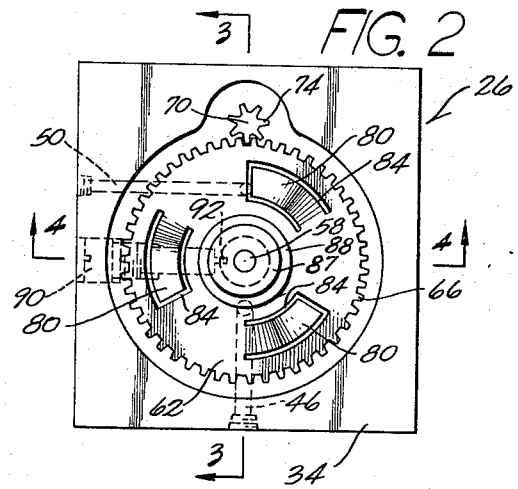
FIGURE 2 is an enlarged view, with parts removed, of an oil pump of the oil pumping system shown in FIGURE 1.
Figure 4:
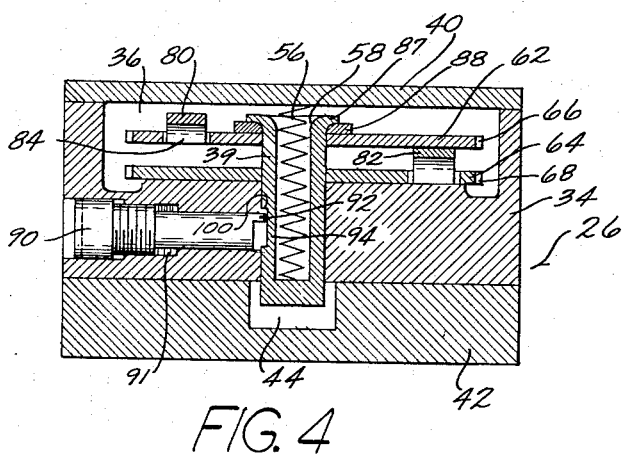
FIGURE 4 is an enlarged, sectional view taken along line 4—4 of FIGURE 2.

Referring now to the drawings and more particularly to FIGURE 1, shown therein is a chain saw 10 which includes a prime mover, such as an internal combustion engine 12 having a cylinder 14, a piston 16 disposed in the cylinder 14, a connecting rod 18, and an output or crankshaft 20.

As shown diagrammatically in FIGURE 1, the chain saw 10 includes an oil supply system 22 including a reservoir 24, a pump 26, a supply conduit 28 connecting the pump 26 and the reservoir 24, and a discharge conduit 30 leading from the pump 26 to the saw chain 32 or some other component which is desired to be lubricated.

The pump 26 is driven by the engine 12 so as to continuously periodically deliver oil from the reservoir 24 to the discharge conduit 30 which, as previously mentioned, can supply oil to the saw chain 32. The saw chain 32 operates at high speeds and is desirably lubricated only once during several hundred rotations of the engine crankshaft 20. Therefore, the pump 26 affords intermittent periodic lubricant supply.

Referring now to the illustrated embodiment shown in FIGURES 2–5, the pump 26 generally comprises a housing 34 formed with a cavity 36 and a central bore 38 defining a pumping cylinder or piston guideway which can constitute a portion of a pumping chamber, to be described hereinafter, and which receives a piston means in the form of a piston 39. The housing 34 includes a cover plate 40 and a bottom member 42 formed with a recess or pumping chamber 44 communicating with the pumping cylinder. Withdrawal of the piston 39 from the pumping chamber 44 affords oil flow from the reservoir 24 to the pumping chamber 44 through an inlet or inlet passageway 46. If desired, and as will be seen in the other embodiments of the invention, the inlet 46 can communicate with cavity 36 to provide lubrication of the gears (hereinafter to be described) disposed therein. A first check valve 48 is disposed at the inlet 46 for preventing return flow of oil through the inlet passageway 46. The inlet passageway 46 is suitably connected to the supply conduit 28.

Insertion of the piston 39 into the pumping chamber 44 completes the pumping cycle and affords oil pumping or discharge from the pumping chamber 44 through an outlet or outlet passageway 50 which is suitably connected to the discharge conduit 30 by suitable connecting means. The housing 34 includes an enlarged portion 52 in which is disposed a second check valve 54 for preventing return oil flow from the outlet passageway 50 to the housing 34.

Means are provided for intermittently reciprocating the piston 39 to afford periodic fluid pumping operation from the inlet 46 to the outlet 50. Generally, the reciprocating means includes means in the form of at least two gears or members rotatably carried on the housing 34 in cooperating relation to the piston 39, means for affording relative rotation of at least one of the gears with respect to the other of the gears, and means for affording intermittent insertion and withdrawal of the piston relative to the pumping chamber in response to said relative rotation of the gears. In the illustrated embodiment shown in FIGURES 2–5, the piston reciprocating means generally includes gear means in the form of first and second gears 62 and 64 coaxially aligned and carried on the piston 39 for axial movement of one of the gears 62 and 64 relative to the piston 39 and for rotatable movement of both of the gears 62 and 64 relative to the piston 39, together with means for affording relative rotation between the gears 62 and 64, and means for affording intermittent insertion and withdrawal of the piston 39 relative to the pumping chamber 44 in response to relative rotation between the gears 62 and 64. The piston insertion and withdrawal means includes means biasing the piston 39 toward or into the pumping chamber 44, means for intermittently axially separating the gears 62 and 64 in response to relative rotation therebetween, and means linking one of the gears 62 and 64 to the piston 39 to afford piston withdrawal in response to axial gear separation in opposition to said biasing means and to afford return of the gears 62 and 64 toward each other when permitted by the relative rotation between the gears 62 and 64 and in response to piston movement inwardly of the pumping chamber 44 under the action of the biasing means.

The means for biasing the piston 39 into the pumping chamber 44 includes a spring 56 disposed in a central cavity 58 formed in the piston 39. One end of the spring 56 contacts the botom of the cavity 58 and the other end engages the cover plate 40. The spring 56 is normally compressed so as to continually bias the piston 39 inwardly of the pumping chamber 44.

In the disclosed construction, the means for affording relative rotation of the first and second gears 62 and 64 includes means for effecting simultaneous rotation of the first and second gears and the provision of differing numbers of gear teeth on the first and second gears 62 and 64. Specifically, the first gear 62 is provided with gear teeth 66 numbering 60, and second gear 64 is provided with gear teeth 68 numbering 61.

The means for simultaneously rotating the gears 62 and 64 includes a drive shaft 70 journaled on the housing 34 by suitable bearings 72. The drive shaft 70 carries a driver or driving gear 74 at one end and is suitably connected to the engine 12 at the other end. The driving gear 74 is meshed with the first and second gears 62 and 64 to afford simultaneous rotation of the gears 62 and 64 and relative rotation therebetween.

Figure 5:
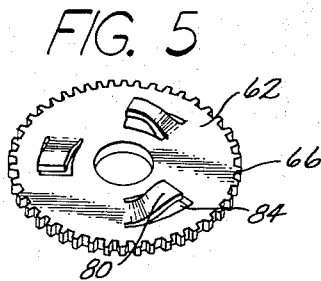
FIGURE 5 is a perspective view, on a reduced scale, of one component of the oil pump shown in FIGURE 2.

The means for intermittently axially separating the first and second gears 62 and 64 in response to relative rotation of the first and second gears 62 and 64 includes raised parts or cams 80 and 82 respectively disposed on the first and second gears 62 and 64, as shown in FIGURE 5. The raised parts 80 of the first gear 62 form corresponding recesses or recessed portions 84 to receive the raised parts 82 of the second gear 64. When the raised parts 82 are received in the recesses 84, the first and second gears 62 and 64 can come together whereby the adjacent faces 85 and 86 contact each other. When the raised parts 82 are removed from the recesses 84, the raised parts 82 ride on the face 85 of the first gear 62 whereby the first and second gears 62 and 64 are separated from each other.

It is preferred to form both gears 62 and 64 with raised parts to afford interchangeability of the gears 62 and 64, and thereby increase the wear life of the gears. However, if desired, one of the gears 62 and 64 can merely be provided with recesses, and the other gear provided with raised parts.

Relative rotation of the first and second gears, 62 and 64, as previously described, affords axial separation of the first and second gears each time the raised parts 82 are removed from the recesses 84 and permits movement of the first and second gears 62 and 64 toward each other when the raised parts 82 are aligned with the recesses 84. In the preferred embodiment, the second gear 64 is provided with three raised parts or cams 82, and the first gear 62 is provided with three corresponding recesses 84.

The means linking one of the gears 62 and 64 to the piston 39 to afford piston withdrawal in response to axial gear separation in opposition to the biasing force of the spring 56 and to afford return of the gears 62 and 64 toward each other in response to piston movement inwardly of the pumping chamber 44 when permitted by the relative rotation between the gears 62 and 64 includes a flange 87 formed on the end of the piston 39. A washer 88 is carried on the piston 39 between the flange 87 and the gear 62. Axial separation of the gears 62 and 64 causes the washer 88 to contact the flange 87 and thereby withdraw the piston 39, against the spring biasing force, from the pumping chamber 44 to provide a suction stroke drawing oil from the reservoir 24 into the pumping chamber 44. When the gears 62 and 64 have relatively rotated so that the raised parts 82 are aligned with the recesses 84, the biasing force of the spring 56 moves the piston 39 inwardly for insertion into the pumping chamber 44 and correspondingly moves the gear 62 toward the gear 64.

Means are provided for adjustably varying the stroke of the piston 39. In the preferred embodiment shown in FIGURES 3 and 4, an adjustable screw 90 is threadedly received in a bore 91 in the housing 34. The screw 90 includes an eccentric cam 92 at one end thereof. The eccentric cam 92 is disposed in an associated axially extending groove 94 in the piston 39. Rotation of the screw 90 differently positions the cam 92 to accordingly adjustably limit or vary the stroke of the piston 39. The cam 92 contacts the land 100 to act as a stop to limit the piston travel.

Figure 6:
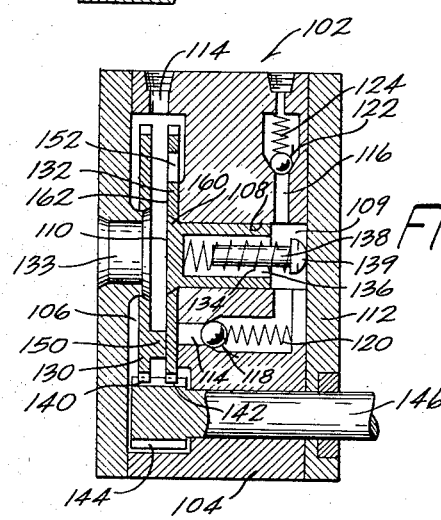
FIGURE 6 is a cross sectional view, similar to FIGURE 3, of a pump embodying a modified form of the invention.

Referring now to the illustrated embodiment shown in FIGURE 6, the pump 102 generally comprises a housing 104 formed with a cavity 106 and a central bore 108 defining a pumping cylinder which constitutes a portion of a pumping chamber 109. Movably disposed in the bore 108 is a piston means in the form of a piston 110. The housing 104 includes a cover plate 112. Reciprocation of the piston 110 in the pumping chamber 108 affords oil pumping from an inlet passageway 114 to an outlet passageway 116. The inlet passageway 114 is disposed to communicate with, and include as part thereof, the cavity 106 to provide inlet oil flow from a reservoir, such as the reservoir 24 shown in FIGURE 1, through a first check valve 118 biased by a spring 120 and to the pumping chamber 109. Oil is pumped from the pumping chamber 108 through the outlet 116 and through a second check valve 122 biased by a spring 124.

Means are provided for intermittently reciprocating the piston 110 to afford periodic fluid pumping operation from the inlet 114 to the outlet 116. In the illustrated embodiment shown in FIGURE 6, the reciprocating means includes gear means in the form of first and second gears 130 and 132 coaxially aligned and carried on the housing 104 for axial movement of one of the gears 130 and 132 relative to the piston 110 and for rotatable movement of both of the gears 130 and 132 relative to the piston 110, together with means for affording relative rotation between the gears 130 and 132, and means for effecting intermittent insertion and withdrawal of the piston 110 relative to the pumping chamber 109 in response to relative rotation between the gears 130 and 132.

The piston insertion and withdrawal means includes means biasing the piston 110 away from or out of the pumping chamber 109, means for intermittently axially separating the gears 130 and 132 in response to relative rotation therebetween, and means linking one of the gears 130 and 132 to the piston 110 to afford piston insertion in response to axial separation in opposition to said biasing means and to afford return of the gears toward each other when permitted by relative rotation between the gears and in response to piston withdrawal or movement outwardly of the pumping chamber under the action of the biasing means.

More specifically, the gear 130 is rotatably carried on a stub shaft 133 fixed to the cover plate 112, which shaft 133 is axially aligned with the piston 110. The gear 132 is rotatably carried on the piston 110 (as will hereinafter be described) and is axially aligned with the gear 130.

The means biasing the piston 110 out of the pumping chamber 109 includes a spring 134 disposed in a central cavity 136 formed in the end of the piston 110. The spring is disposed in encircling relation to a stud 138 also disposed in the piston cavity 136 and having a rounded end or head 139 contacting the surface of the pumping chamber to afford a limited amount of rocking movement of the stud 138. The spring 134 is compressed between the rounded end 139 and the end of the cavity 136 formed in the piston 110. In its normally compressed condition, the spring 134 biases the piston 110 outwardly of the pumping chamber.

In the disclosed construction, the means for affording relative rotation of the first and second gears 130 and 132 includes means for effecting simultaneous rotation of the gears 130 and 132 and the provision of differing numbers of gear teeth on the first and second gears 130 and 132. Specifically, first gear 130 is provided with gear teeth 140 numbering 60, and the second gear 132 is provided with gear teeth 142 numbering 61. The means for simultaneously rotating the gears 130 and 132 includes a common driver 144 carried on a drive shaft 146.

The means for intermittently axially separating the gears 130 and 132 in response to relative rotation therebetween includes raised parts or cams 150 disposed on first gear 130 and corresponding recesses or recessed portions 152 disposed on gear 132. When the raised parts 150 are received in the recesses 152, the first and second gears 130 and 132 can come together, and when the raised parts 150 are removed from the recesses 152, the first and second gears 130 and 132 are separated. In the disclosed construction, three raised parts 150 and three recesses 152 are provided.

The means linking one of the gears 130 and 132 to the piston 110 to afford piston insertion in response to axial gear separation in opposition to the biasing force of the spring 134 and to afford return of the gears 130 and 132 toward each other in response to piston movement outwardly of the pumping chamber 109 when permitted by the relative rotation between the gears 130 and 132 includes a flange portion or part 160 on the end of the piston 110 arranged to co-axially connect the gear 132 to the piston 110 for rotatable movement of the gear 132 relative to piston 110 and for axial movement of the gear 132 with the piston. When the raised parts 150 are aligned with the recess portions 152, the biasing force of the spring 134 withdraws the piston 110 from the pumping chamber 109 to provide a suction stroke. As the gears 130 and 132 relatively rotate, the raised portions 150 are removed from the recess portions 152 and ride on a face 162 of the gear 132 to afford axial separation of the gears 130 and 132 and insertion of the piston into the pumping chamber to provide a positive pumping stroke.

In the embodiment shown in FIGURE 6, the inlet 114 is disposed to communicate with the cavity 106 containing the gears 130 and 132 whereby inlet oil passes through the cavity to thereby afford lubrication of the gears 130 and 132. This arrangement is applicable to all other embodiments.

Figure 7:
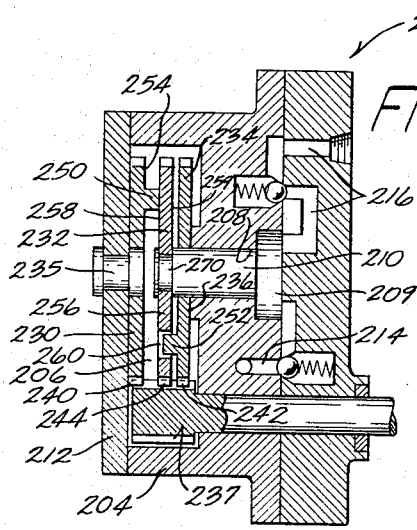
FIGURE 7 is a cross sectional view, similar to FIGURE 3, embodying another modified form of the invention.
Figure 8:
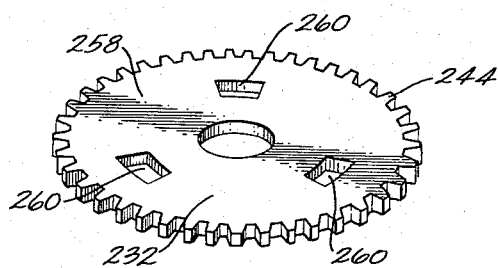
FIGURE 8 is a perspective view, on an enlarged scale, of a component of the device shown in FIGURE 7.

Referring now to the illustrated embodiments shown in FIGURES 7 and 8, the pump 202 generally includes a housing 204 formed with a cavity 206 and a central bore 208 defining a pumping cylinder or piston guideway which can constitute a portion of a pumping chamber 209. A piston 210 is movably disposed in the bore 208. The housing 204 includes a cover plate 212 and is formed with an inlet passageway 214 and an outlet passageway 216.

In the illustrated embodiment shown in FIGURES 7 and 8, the reciprocating means includes gear means in the form of first, second and third gears 230, 232 and 234 coaxially carried on the housing 204 for axial movement of one of the gears relative to the other gears and for rotatable movement of all of the gears 230, 232 and 234 relative to the piston 210, together with means for affording relative rotation of at least one of the gears with respect to the other gears, and means for affording intermittent insertion and withdrawal of the piston 210 relative to the pumping chamber 209 in response to said relative rotation of one of the gears with respect to the other gears. The piston insertion and withdrawal means includes means for intermittently axially separating, in sequential order, one of the gears with respect to the other gears in response to said relative rotation of the gears, and means linking one of the gears to the piston 210 to afford piston insertion and withdrawal in response to axial separation of the gears.

The gear 230 is rotatably carried on a stub shaft 235 fixed to the cover plate 212, which shaft 235 is axially aligned with the piston 210. The gear 234 is rotatably carried on the piston 210 and is disposed between a surface 236 of the housing 204 and the gear 232. The gear 232 is rotatably carried on the end of piston 210 as will hereinafter be further described.

In the disclosed construction, the means for affording relative rotation of the first, second and third gears includes means for effecting simultaneous rotation of the gears as by the common driver 237, and the provision of differing numbers of gear teeth on the gears. Specifically, the first and third gears 230 and 234 are provided with gear teeth 240 and 242 numbering 60, and the second gear 232 is provided with gear teeth 244 numbering 61. Under this arrangement, the gears 230 and 234 rotate in unison and the gear 232 rotates relative to the gears 230 and 234.

The means for intermittently axially separating one of the gears, namely the gear 232, with respect to the other gears 230 and 232, in response to relative rotation between the gears as described above, includes one or more raised parts 250 and 252 disposed respectively on the faces 254 and 256 of the gears 230 and 234 for respectively engaging the opposite faces 258 and 259 of the second gear 252. Also, in this regard, the gear 232 includes a series of elongated recesses or recessed portions 260, which are arranged to separately receive the raised parts 250 and 252. The raised parts and recesses are arranged so that when the raised parts 250 of the gear 230 are removed from the recessed portions 260, the raised parts 252 of the gear 234 are received in the recessed portions 260 and vice versa.

The gear 232 is linked to the piston 210 to afford piston insertion and withdrawal in response to axial separation of one of the gears. This linkage includes a member 270 carried on the end of piston 210 and arranged to centrally connect the gear 232 to the piston 210 for rotatable movement of the gear 232 relative to the piston 210 and for movement of the gear 232 with the piston 210.

In operation, the suction stroke of the pump 202 is effected by axial separation of the gears 232 and 234 under the action of the raised parts 252 withdrawing from the recessed portions 260 and riding on the face 259 of the gear 232 to thereby correspondingly move the gear 232 in a direction affording withdrawal of the piston 210 from the pumping chamber 209. Simultaneously with the withdrawal of the raised parts 252 from the recessed portions 250, the raised parts 250 of the gear 230 are positioned for insertion into the recessed portions 260 thereby to allow the gears 232 and 234 to separate and to also allow the gears 230 and 232 to come together. The pumping stroke of the pump 202 is effected by axial separation of the gears 230 and 232 under the action of the raised parts 250 withdrawing from the recessed portions 260 and riding on the face 258 of the gear 232 to thereby move the gear 232 in a direction affording insertion of the piston 210 into the pumping chamber 209. Simultaneously therewith, the raised parts 252 are positioned for insertion into the recessed portions 260 to thereby allow the gears 230 and 232 to separate and to also allow the gears 232 and 234 to come together to thereby complete a pumping cycle of the pump 202.

Figure 9:
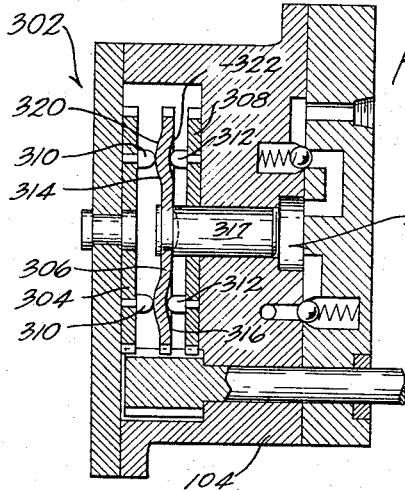
FIGURE 9 is a cross sectional view, similar to FIGURE 3, embodying still another modified form of the invention.
Figure 10:
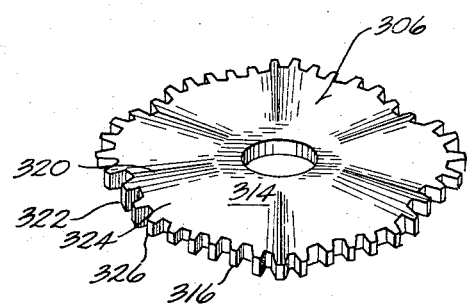
FIGURE 10 is a perspective view on an enlarged scale, of a component of the device shown in FIGURE 9.

Referring now to the embodiment shown in FIGURES 9 and 10, the arrangement of the pump 302 there shown is similar to the pump 202 shown in FIGURES 7 and 8 in all respects except for the arrangement of the gears 304, 306 and 308. In particular, the gears 304 and 308 are respectively provided with raised parts 310 and 312. The second gear 306 instead of having recessed portions as shown in the embodiments in FIGURES 7 and 8, is provided with undulated or sinusoidally curved surfaces 314 and 316. The raised parts 310 of the gear 304 engage the surface 314, and the raised parts 312 of the gear 308 engage the surface 316. Upon relative rotation of the gear 306 with respect to the gears 304 and 308, in a manner as previously described, the gear 306 acts as a follower and the raised parts 310 and 312 act as cams to reciprocate a piston 317 in a pumping chamber 318 as the surfaces 314 and 316 follow the raised parts 310 and 312. When the raised parts 310 contact the convexity or high point 320 of the surface 314, the raised parts 312 simultaneously contact the concavity or low point 322 of the surface 316 and the piston 317 is correspondingly inserted into the pumping chamber 318. Conversely, as the raised parts 310 contact the concavity or low point 324 of surface 314 (FIGURE 10), the raised parts 312 simultaneously contact the convexity or high point 326 of the surface 316 (FIGURE 10) and correspondingly withdraw the piston 317 from the pumping chamber 318 to thereby complete a pumping operation. Any number of raised parts can be employed, as well as any number of convexities and concavities on the surfaces 314 and 316.

This invention contemplates the use of differentially rotatable rotors or other members in place of the gears described in the various embodiments of the invention.

Various of the features of the invention are set forth in the following claims.

What is claimed is:

1. A pump comprising a housing forming a pumping chamber having an inlet and an outlet, a piston cooperating with said housing and extendable into said pumping chamber, and gear means disposed in said housing for rotation and for axial movement in response to said rotation, said gear means cooperating with said piston for intermittently reciprocating said piston in said chamber in response to axial movement of said gear means to afford periodic fluid pumping operation from said inlet to said outlet.

2. A pump in accordance with claim 1 including adjustable means carried on said housing for selectively adjusting the range of movement of said piston to accordingly vary the amount of fluid pumped in said fluid pumping operation.

3. A chain saw including an engine, an oil pump comprising a housing having a pumping chamber including an inlet and an outlet, piston means cooperating with said housing and extendable into said pumping chamber, and gear means located in said housing for rotation and for axial movement in response to said rotation, said gear means cooperating with said piston means for intermittently reciprocating said piston means in said chamber in response to axial movement of said gear means to afford periodic fluid pumping operation from said inlet to said outlet, a reservoir, an oil conduit communicating between said reservoir and said inlet, a first check valve communicating with said inlet to prevent return oil flow to said reservoir, and a second check valve communicating with said outlet to prevent return oil flow to said housing.

4. An oil pump including a housing formed with a pumping chamber having an inlet and an outlet, a guideway extending from said pumping chamber, a piston disposed in said guideway for reciprocal movement relative to said pumping chamber, two gears rotatably carried on said housing in cooperating relation to said piston, a third gear meshed with said first and second gears for rotatably driving said first and second gears, and means for intermittently reciprocating said piston in response to rotation of said gears to afford periodic fluid pumping operation from said inlet to said outlet.

5. An oil pump including a housing formed with a guideway, a pumping chamber communicating with said guideway, a piston disposed in said guideway for reciprocal movement relative to said pumping chamber, two gears rotatably carried on said housing in cooperating relationship with said piston, a pinion meshed with said two gears for rotation thereof, one of said gears having gear teeth of differing number than the other of said gears to afford relative rotation of said one gear with respect to the other of said gears, and means for intermittently reciprocating said piston in response to said relative rotation of said gears to afford periodic fluid pumping operation.

6. An oil pump including a housing formed with a guideway, a pumping chamber extending from said guideway, a piston disposed in said guideway for reciprocal movement relative to said pumping chamber, and means for intermittently reciprocating said piston to afford periodic fluid pumping operation, said piston reciprocating means including gear means in the form of at least two gears rotatably carried on said housing in cooperating relation to said piston, a pinion meshed with said two gears for rotation thereof, means for affording relative rotation of one of said gears with respect to the other of said gears, and means for affording intermittent insertion and withdrawal of said piston relative to said pumping chamber in response to said relative rotation of said gears.

7. An oil pump including a housing formed with a pumping chamber, a piston cooperating with said housing for reciprocal movement relative to said pumping chamber, and means for intermittently reciprocating said piston to afford periodic fluid pumping operation, said reciprocating means including two gears rotatably carried on said housing in cooperating relationship to said piston and to each other, means for affording relative rotation of said gears, and means for affording intermittent insertion and withdrawal of said piston relative to said pumping chamber in response to said relative rotation of said gears, said piston insertion and withdrawal means including means biasing said piston in one direction relative to said pumping chamber, means for intermittently axially separating said gears in response to said relative rotation of said gears, and means linking one of said gears to said piston to afford piston movement in a direction opposite said one direction in response to axial gear separation in opposition to said biasing means and to afford return of said gears toward each other when permitted by the relative rotation between said gears and in response to piston movement in said one direction under the action of said biasing means.

8. An oil pump in accordance with claim 7 including means for simultaneously driving said gears.

9. An oil pump in accordance with claim 7 wherein said biasing means includes a central cavity in said piston and a spring disposed in said cavity for biasing said piston in said one direction whereby axial separation of said first and second gears moves said piston in a direction opposite to said one direction.

10. An oil pump including a housing formed with a cylinder, a pumping chamber extending from said cylinder and including an inlet and an outlet, a piston disposed in said cylinder for reciprocal movement relative to said pumping chamber, means biasing said piston in a direction outwardly of said pumping chamber, first and second gears disposed on said housing in cooperating relationship with each other, one of said gears being rotatably carried on said housing in axial alignment with said piston, the other of said gears being coaxially and rotatably carried on said piston, said first and second gears having gear teeth unequal in number to afford relative rotation between said first and second gears, said first and second gears further having adjacent faces, one of said faces including thereon a raised part and the other of said faces including thereon a complementary recessed portion to afford axial separation of said first and second gears when said raised part is removed from said recessed portion and to allow return of said first and second gears toward each other when said raised part is aligned with said recessed portion, means linking one of said first and second gears to said piston to afford piston insertion into said pumping chamber in response to axial separation of said first and second gears in opposition to said biasing means and to afford return of said gears toward each other in response to piston movement outwardly of said pumping chamber when permited bty the relative rotation between said first and second gears to thereby afford periodic fluid pumping operation from said inlet to said outlet.

11. An oil pump in accordance with claim 10 wherein said biasing means includes a central cavity in said piston, a bolt having a rounded head disposed in said cavity, said rounded head engaging one end of said housing, and a spring disposed in said cavity and in encircling relation to said bolt, said spring being compressed between the end of said cavity and said bolt head to afford biasing of said piston in a direction away from said pumping chamber.

12. An oil pump in accordance with claim 10 wherein said linking means includes a member at the end of said piston centrally mounting thereon one of said gears for rotatable movement relative to said piston and for axial movement with said piston.

13. An oil pump including a housing formed with a cylinder, a pumping chamber extending from said cylinder, a pumping chamber extending from said cylinder and including an inlet and an outlet, a piston disposed in said cylinder for reciprocal movement relative to said pumping chamber, means biasing said piston in a direction toward said pumping chamber, first and second gears coaxially and rotatably carried on said housing, said first and second gears having gear teeth unequal in number to afford relative rotation between said first and second gears, said first and second gears further having adjacent faces, one of said faces including thereon a raised part and the other of said faces including thereon a complementary recessed portion to afford axial separation of said first and second gears when said raised part is removed from said recessed portion and to allow return of said first and second gears toward each other when said raised part is aligned with said recessed portion, and means linking one of said first and second gears to said piston to afford piston withdrawal from said pumping chamber in response to axial separation of said first and second gears in opposition to said biasing means and to afford return of said gears toward each other in response to piston movement inwardly of said pumping chamber when permitted by the relative rotation between said first and second gears to thereby afford periodic fluid pumping operation from said inlet to said outlet.

14. An oil pump in accordance with claim 13 wherein said linking means includes a flange at one end of said piston whereby axial separation of said first and second gears engages one of said first and second gears with said flange to thereby move said piston in said opposite direction.

15. An oil pump in accordance with claim 13 wherein said biasing means includes a central cavity in said piston and a spring disposed in said cavity for biasing said piston in a direction toward said pumping chamber, said spring being compressed between the end of said cavity and said housing.

16. A chain saw including an engine, an oil pump provided with a housing formed with a pumping chamber, a piston cooperating with said housing for reciprocal movement relative to said pumping chamber, and means for intermittently reciprocating said piston to afford periodic fluid pumping operation, said reciprocating means including two gears rotatably carried on said housing in cooperating relationship to said piston and to each other, means for affording relative rotation of said gears, and means for affording intermittent insertion and withdrawal of said piston relative to said pumping chamber in response to said relative rotation of said gears, said piston insertion and withdrawal means including means biasing said piston in one direction relative to said pumping chamber, means for intermittently axially separating said gears in response to said relative rotation of said gears, and means linking one of said gears to said piston to afford piston movement in a direction opposite said one direction in response to axial gear separation in opposition to said biasing means and to afford return of said gears toward each other when permitted by said relative rotation of said gears and in response to piston movement in said one direction under the action of said biasing means.

17. A chain saw in accordance with claim 16 including a shaft drivingly connected to said engine, and a driving gear carried on said shaft in meshed engagement with said first and second gears to afford simultaneous rotation of said first and second gears.

18. An oil pump including a housing formed with a pumping chamber, a piston cooperating with said housing for reciprocal movement relative to said pumping chamber, and means for intermittently reciprocating said piston to afford periodic fluid pumping operation, said reciprocating means including gear means in the form of at least two gears rotatably carried on said housing in cooperating relation to said piston, means for affording relative rotation of at least one of said gears with respect to the other of said gears, and means for affording intermittent insertion and withdrawal of said piston relative to said pumping chamber in response to said relative rotation of one of said gears with respect to the other of said gears, said piston insertion and withdrawal means including means for intermittently separating one of said gears with respect to each of the other of said gears in response to said relative rotation of said one of said gears with respect to the other of said gears, and means linking one of said gears to said piston to afford piston insertion and withdrawal in response to said axial gear separation of said one of said gears with respect to each of the other of said gears.

19. An oil pump including a housing formed with a guideway, a pumping chamber communicating with said guideway, a piston disposed in said guideway for reciprocal movement relative to said pumping chamber, and means for intermittently reciprocating said piston to afford periodic fluid pumping operation, said reciprocating means including gear means in the form of three gears rotatably carired on said housing in cooperating relationship to said piston and to each other, one of said gears being rotatably carried on said housing in cooperating relationship to said ton, a second of said gears being rotatably carried on the end of said piston, and a third of said gears being coaxially and rotatably carried on said housing for axial movement relative to said piston, means for affording relative rotation of the second of said gears with respect to said other gears, and means for affording intermittent insertion and withdrawal of said piston relative to said pumping chamber in response to relative rotation of said second gear with respect to said other gears, said piston insertion and withdrawal means including means for intermittently separating, in sequential order, said second gear with respect to each of said other gears, and means linking said second gear to said piston to afford piston insertion and withdrawal in response to said axial separation of said second gear with respect to said other gears.

20. An oil pump in accordance with claim 19 wherein said means linking the second of said gears to said piston includes a member at the end of said piston rotatably carrying said second gear on said piston for rotation relative to said piston and for axial movement with said piston.

21. An oil pump in accordance with claim 19 wherein said means for intermittently axially separating the second of said gears with respect to each of said other gears includes a series of raised parts on opposed faces of said other gears and a series of recessed portions on said second gear cooperating with said raised parts whereby when said raised parts of said first gear are received in said recessed portions, said raised parts of said third gear are removed from said recessed portions to thereby move said piston in one direction and when said raised parts of said first gear are removed from said recessed portions, said raised parts of said third gear are received in said recessed portions to thereby move said piston in an opposite direction to complete the pumping cycle.

22. An oil pump in accordance with claim 19 wherein said means for intermittently separating one of said gears with respect to each of the other of said gears includes the second of said gears having opposite faces including cam surfaces thereon, said other gears having cam followers respectively engaged with said cam surfaces whereby relative rotation of the second of said gears with respect to said other gears separates, in sequential order, the second of said gears with respect to said one gear and the second of said gears with respect to the third of said gears.

23. A pump comprising a housing forming a pumping chamber, a piston cooperating with said housing and extendable into said pumping chamber, differentially rotatable members in said housing cooperable with said piston and differentially rotatable by a pinion meshed therewith, and means for intermittently reciprocating said piston in said chamber in response to differential rotation of said members to afford periodic fluid pumping operation.

24. An oil pump including a housing formed with a pumping chamber, a piston cooperating with said housing for reciprocal movement relative to said pumping chamber, at least two relatively rotatable members carried on said housing in cooperating relationship to said piston and meshed with a pinion for driving rotation thereof, and means for intermittently reciprocating said piston in response to said relative rotation of said members to afford periodic fluid pumping operation.

25. An oil pump including a housing formed with a pumping chamber, a piston cooperating with said housing for reciprocal movement relative to said pumping chamber, at least two members rotatably carried on said housing in cooperating relation to said piston and meshed with a pinion for driving rotation thereof, means for affording relative rotation between said members, means for affording axial separation of said members in response to said relative rotation, and means for intermittently reciprocating said piston in said chamber in response to said axial separation of said members to afford periodic fluid pumping operation.

References Cited

UNITED STATES PATENTS

| | | | |
|---|---|---|---|
| 838,565 | 12/1906 | McCanna. | |
| 1,940,792 | 12/1933 | Eacock et al. | 184—27 |
| 2,507,879 | 5/1950 | Beaudoin | 103—54 |
| 2,809,718 | 10/1957 | Kos | 184—27 |

ROBERT M. WALKER, *Primary Examiner.*

UNITED STATES PATENT OFFICE
CERTIFICATE OF CORRECTION

Patent No. 3,331,331                                July 18, 1967

Finn T. Irgens et al.

It is hereby certified that error appears in the above numbered patent requiring correction and that the said Letters Patent should read as corrected below.

Column 3, line 8, for "botom" read -- bottom --; column 9, line 4, for "bty" read -- by --; column 10, line 42, for "carired" read -- carried --; lines 44 and 45, for "cooperating relationship to said ton," read -- axial alignment with said piston --.

Signed and sealed this 1st day of October 1968.

(SEAL)
Attest:

Edward M. Fletcher, Jr.                               EDWARD J. BRENNER
Attesting Officer                                         Commissioner of Patents